(12) United States Patent
Steinke

(10) Patent No.: US 6,528,903 B2
(45) Date of Patent: Mar. 4, 2003

(54) CONVERTER SYSTEM HAVING CONVERTER MODULES CONNECTED BY A DC INTERMEDIATE CIRCUIT, AND METHOD FOR OPERATING SUCH A SYSTEM

(75) Inventor: Jürgen Steinke, Albbruck (DE)

(73) Assignee: ABB Industrie AG, Baden (CH)

( * ) Notice: Subject to any disclaimer, the term of this patent is extended or adjusted under 35 U.S.C. 154(b) by 0 days.

(21) Appl. No.: 09/964,445

(22) Filed: Sep. 28, 2001

(65) Prior Publication Data

US 2002/0041504 A1 Apr. 11, 2002

(30) Foreign Application Priority Data

Oct. 6, 2000 (EP) .............................. 00810923

(51) Int. Cl.[7] ................................................. H02J 1/00
(52) U.S. Cl. ........................................................ 307/39
(58) Field of Search ....................... 363/65, 71; 307/12, 307/16, 30, 31, 33, 34, 38, 39

(56) References Cited

U.S. PATENT DOCUMENTS

| | | |
|---|---|---|
| 5,122,726 A | 6/1992 | Elliott et al. |
| 5,999,428 A | * 12/1999 | Dahler et al. .................. 363/71 |
| 6,317,345 B1 | * 11/2001 | Hayward et al. .............. 363/65 |

FOREIGN PATENT DOCUMENTS

| | | |
|---|---|---|
| DE | 197 36 903 | 3/1999 |
| EP | 0 784 375 | 7/1997 |

* cited by examiner

Primary Examiner—Matthew Nguyen
(74) Attorney, Agent, or Firm—Burns, Doane, Swecker & Mathis, L.L.P.

(57) ABSTRACT

A converter system has a number of individual converter modules, which are in the form of load converter modules or power supply system converter modules and are connected to one another via a DC voltage intermediate circuit which has two DC voltage busbars and a DC voltage intermediate circuit capacitance arranged between the DC voltage busbars. A defective converter module is isolated from a common intermediate circuit, in which interruption-free further operation of the other modules on the intermediate circuit is possible and in which the isolating means are not destroyed. The DC voltage intermediate circuit capacitance is subdivided into a number of parts corresponding to the number of converter modules. Each of the converter modules is associated with a portion of the DC voltage intermediate circuit capacitance and forms a local intermediate circuit. The converter modules are coupled together with their local intermediate circuits to the DC voltage busbars by at least one protective switch.

9 Claims, 4 Drawing Sheets

CONVERTER SYSTEM HAVING CONVERTER MODULES CONNECTED BY A DC INTERMEDIATE CIRCUIT, AND METHOD FOR OPERATING SUCH A SYSTEM

FIELD OF THE INVENTION

The present invention relates to the field of power electronics. It relates in particular to a converter system as claimed in the precharacterizing clause of claim 1, and to a method for operating such a system.

BACKGROUND OF THE INVENTION

When a number of voltage intermediate circuit converters with the same intermediate circuit voltage level are used in an industrial system, it may be advantageous to form a system with coupled voltage intermediate circuits, referred to as a common DC-bus system, rather than using individual converters, each based on a power supply system converter, a voltage intermediate circuit and a load converter. This common DC-bus system comprises power supply system converter modules (passively with diodes or actively with controlled semiconductor switches), one or more intermediate circuit modules and load converter modules (for example motor feed, generator feed, etc.).

The advantages of this system are, for example, that power can be interchanged freely between the load modules without any necessity to use bidirectional power supply system converter modules, the use of common auxiliary devices (charging apparatus for the intermediate circuit, overvoltage limiters, brake controllers, etc.), and the capability to use relatively large, low-cost modules as power supply system converters. If, for example, there are five load modules which each feed their load with a power of 100 kW, a single power supply system converter module of 500 kW can supply the system. This saves not only converter costs, but possibly also transformer costs.

However, a system such as this also has disadvantages, which need to be counteracted by appropriate measures. One important problem in this case is protection of the system when one of the converter modules fails. If all the modules were to be coupled to the common intermediate circuit without any further measures, a short circuit in a single module would lead to the common intermediate circuit being short-circuited, and thus to the failure of the entire system. Furthermore, the amount of energy in the intermediate circuit, which is higher than that in an individual converter, can lead to damage in the defective module, which assumes a far greater extent than would be the case in an individual converter.

One normal solution to this problem is to couple the individual converter modules to the common intermediate circuit via a protective device. This limits the destructive amount of energy which is introduced into the defective module and isolates the module from the rest of the system, so that it is possible to continue to operate the rest of the system. However, this solution has significant disadvantages: firstly the protective devices act so slowly that this interferes with the operation of the other modules.

In general, it is impossible to avoid a brief interruption in operation in this case. Secondly, the protective device is destroyed and must be replaced. This increases the repair time, results in additional repair costs, and also increases the spares stockholding costs.

SUMMARY OF THE INVENTION

The object of the invention is thus to provide a converter system in which a defective converter module is selectively isolated from the common intermediate circuit, in which interruption-free further operation of the other modules on the intermediate circuit is possible, and in which the isolating means are not destroyed, and to specify a method for its operation.

The object is achieved by the totality of the features of claims 1 and 9.

The essence of the invention can be described by two steps:

First Step:

Each converter module has a reasonable proportion of the required DC voltage intermediate circuit capacitance allocated to it ("distributed intermediate circuit"). In this case, the subdivision is typically based on two criteria: the capacitors ("local intermediate circuit") allocated to one converter module should be at least sufficiently large that they can carry the alternating current introduced into the intermediate circuit by this module; and the energy which is stored in the capacitors allocated to one converter module must not exceed the level at which unacceptable destruction would be caused if these capacitors were to discharge into the faulty module.

Apart from the capacitors in the local intermediate circuits, there are no further DC voltage capacitors in the intermediate circuit having a capacitance which is in the same order of magnitude as the capacitances of the locally installed capacitors.

Second Step:

The converter modules with a local intermediate circuit are coupled via at least one protective switch (semiconductor switch) to the DC voltage busbars. In this case, the protective switch is arranged such that it can interrupt any current flow from the positive DC voltage busbar to the positive connection of the local intermediate circuit, and/or any current flow from the negative connection of the local intermediate circuit to the negative DC voltage busbar.

According to a first preferred refinement of the invention, at least one of the converter modules is a converter module which exclusively transfers power from its AC voltage terminals to the DC voltage intermediate circuit, and the protective switch for this converter module is a semiconductor diode. This allows circuitry control complexity to be correspondingly reduced.

According to a second preferred refinement of the invention, at least one of the converter modules is a converter module which transfers power from the DC voltage intermediate circuit to its AC voltage terminals, and the protective switch in this converter module is a controllable power semiconductor switch.

If at least one of the converter modules is a multipoint converter module, the associated local intermediate circuit has a series circuit of capacitors whose junction points form corresponding intermediate points. In principle, multipoint converter modules as well need be coupled to the system only via the positive and the negative busbar, since the intermediate points are formed locally. This reduces the complexity for the DC voltage busbars considerably in comparison to a system having a centrally arranged capacitor unit. Furthermore, it is thus possible to operate converter modules with different numbers of points (for example a three-point converter and a four-point converter) at the same time in the system.

If a number of converter modules are in the form of multipoint converter modules, it is, however, also possible in order to make it easier to stabilize the intermediate points to provide appropriate intermediate point busbars in order to connect the intermediate points in the local intermediate circuits. In particular, if the number of busbars (DC voltage busbars and intermediate point busbars) is n, protective switches should be arranged in at least (n−1) junctions between the local intermediate circuits and the busbars. For example, in a system having a number of three-point converters, this would result in three busbars, so that it would be necessary to use two protective switches for each module.

Fast interruption of the connection between the DC voltage busbars and the defective module makes it possible to continue to operate the rest of the system in the event of a fault. If the converter modules are connected, together with the local intermediate circuits and the protective switches, via additional isolating means to the busbars, which isolating means allow DC isolation between the converter modules and the busbars, the defective module can be DC-isolated from the system when a defect occurs, can then be repaired, and can then be reconnected to the system.

Further embodiments are described in the dependent claims.

BRIEF DESCRIPTION OF THE DRAWINGS

The invention will be explained in more detail in the following text with reference to exemplary embodiments and in conjunction with the drawing, in which.

DETAILED DESCRIPTION OF THE INVENTION

Figure 1:
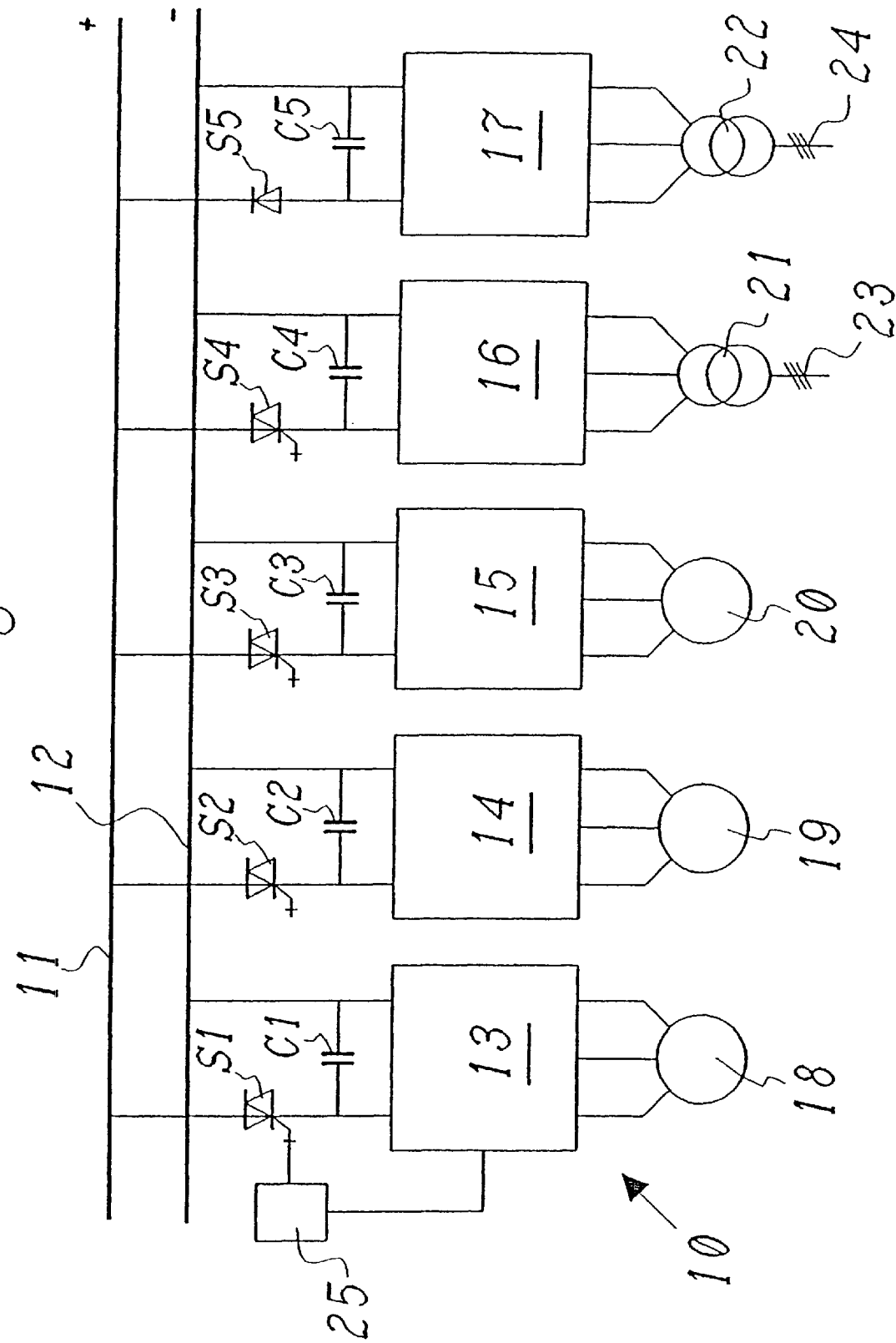
FIG. 1 shows the circuit diagram of a first exemplary embodiment of the invention with various two-point converter modules.

FIG. 1 shows the circuit diagram of a first exemplary embodiment of the invention. The converter system 10 has a total of five converter modules 13, . . . , 17, by way of example, whose DC voltage terminals are connected to two common DC voltage busbars 11 and 12. The converter module 13 is, for example, a load converter module or drive converter module for an asynchronous machine 18 having a drive rating of 3 MW. The converter module 14 is likewise a load converter module or drive converter module for an asynchronous machine 19 having a drive rating of 2 MW. The converter module 15 is a load converter module or drive converter module for a synchronous machine 20 having a drive rating of 5 MW. The converter module 16 is an active power supply system converter module having a rating of 5 MW. The converter module 17 is a passive power supply system converter module (rectifier), likewise having a rating of 5 MW. The AC voltage terminals of both the power supply system converter modules 16, 17 are connected to a respective three-phase power supply system 23 or 24 via a respective three-phase power supply system transformer 21 or 22. The total rating of 10 MW of the two power supply system converter modules 16 and 17 is subdivided via the DC voltage intermediate circuit, which is formed by means of the DC voltage busbars 11, 12, between the load converters 13, . . . , 15, whose overall rating is 3+2+5=10 MW. This system configuration represents just one example, in which all the converter modules except for the power supply system converter module 17 are equipped with controllable power semiconductor components connected in a bridge circuit. Other configurations with a different number, type and rating of power supply system converter modules and load converter modules are, of course, feasible within the scope of the invention.

Instead of one central DC voltage intermediate circuit capacitance, individual capacitance elements (represented symbolically in FIG. 1 by the capacitors C1, . . . , C5) are now allocated to each of the converter modules 13, . . . , 17, are connected between the connecting lines from the converter module to the DC voltage busbars 11, 12, and form a local intermediate circuit. The total capacitance is typically subdivided into the capacitance elements on the basis of two criteria: The capacitors (normally a number of them) allocated to one converter module should be at least sufficiently large that they can carry the alternating current introduced into the intermediate circuit from this module; and the energy which is stored in the capacitors allocated to one converter module must not exceed the level at which unacceptable destruction would be caused if these capacitors were to discharge into the faulty module.

The converter modules 13, . . . , 17 together with their local intermediate circuit (capacitors C1, . . . , C5) are, according to the invention, coupled to the DC voltage busbars 11, 12 via at least one protective switch S1, . . . , S5 in the form of a semiconductor switch (protective semiconductor switch). In this case, the protective switches (semiconductor switches) S1, . . . , S5 are each arranged such that they can interrupt a current flow from the positive DC voltage busbar 11 to the positive connection of the local intermediate circuit—as is shown in FIG. 1—and/or can interrupt a current flow from the negative connection of the local intermediate circuit to the negative DC voltage busbar 12.

If the converter module is a module which transfers only energy from the AC voltage terminals of this module to the DC voltage intermediate circuit (rectifier)—as is the case in the passive power supply system converter module 17 (fitted with diodes) shown in FIG. 1—the protective switch (semiconductor switch S5) may be a diode. If energy is transferred from the DC voltage intermediate circuit to the AC voltage terminals on the converter module—as is the case in the active converter modules 13, . . . , 16 in FIG. 1—the protective switch (semiconductor switch) must be an active switch (for example an IGBT, GTO, IGCT (Integrated Gate Commutated Thyristor) or the like). In the case of an active semiconductor switch, defect detection means should be installed in the associated converter module, which identify the defect sufficiently quickly in order to switch off the active semiconductor switch via a drive device 25 before the current between the DC voltage busbars 11, 12 and the local intermediate circuit has become greater than the maximum permissible current which can be switched off by the protective semiconductor switch. This is shown by way of example in FIG. 1 for the converter module 13 with the protective switch S1. The corresponding drive devices for the other (active) protective switches S2, . . . S4 have been omitted, for the sake of simplicity. The (passive) protective switch S5 does not require a drive device, of course, since it is a diode.

Figure 2:
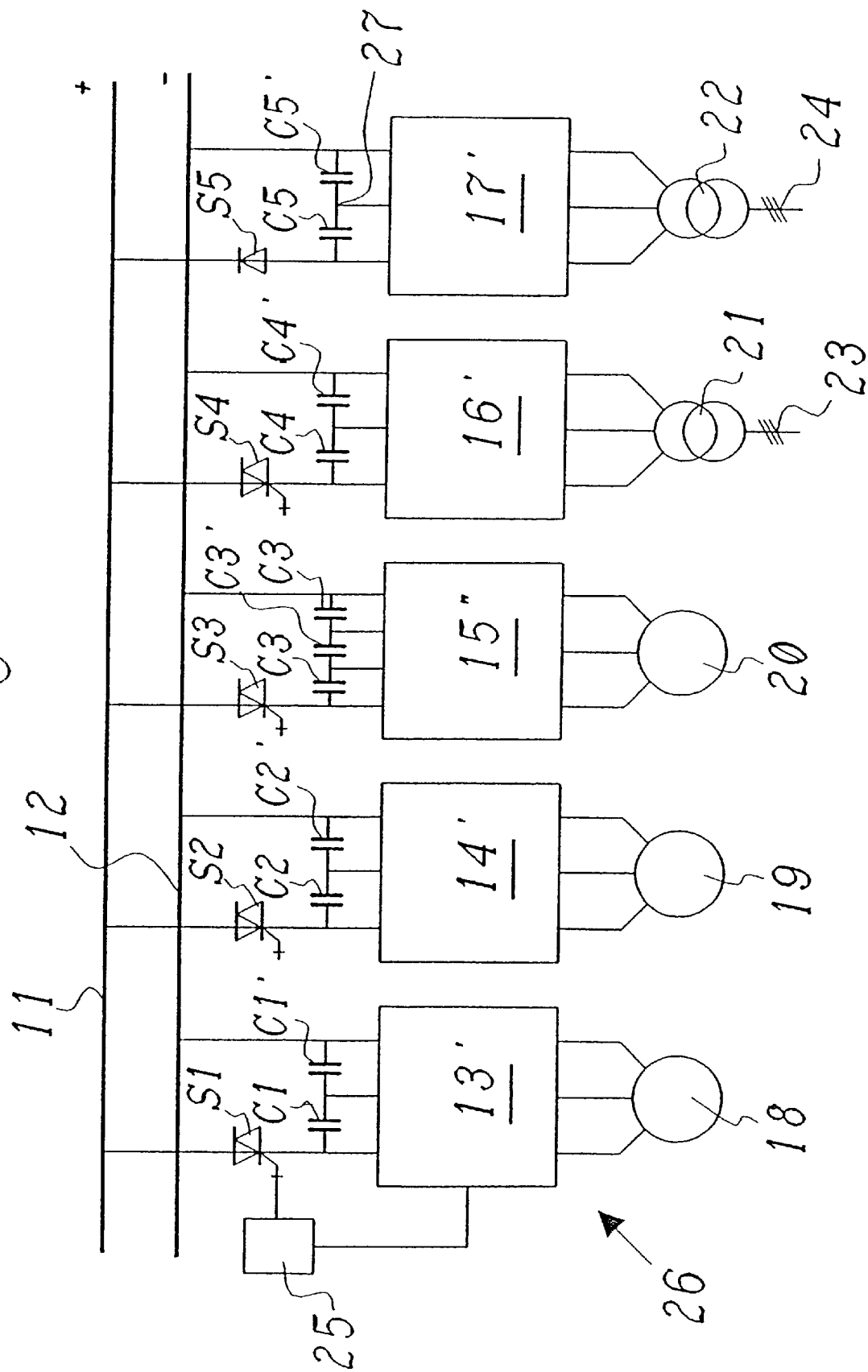
FIG. 2 shows the circuit diagram of a second exemplary embodiment of the invention having four three-point converter modules and one four-point converter module, without the intermediate points being connected.

If, as shown in FIG. 2, converter modules 13', ..., 17' with multipoint converters are used in the converter system 26, the local intermediate circuits comprise capacitors C1, C1'; ...; C5, C5' which are functionally connected in series and whose intermediate junction points 27 (that is to say the points which do not form either the positive or the negative intermediate circuit connection) are used by the converter module. The conventional converter (FIG. 1) is also referred to as a two-point converter and, functionally, has no intermediate points. The widely used three-point converter (13', 14', 16' and 17' in FIG. 2) functionally has one intermediate point, that is to say two series-connected capacitors. The four-point converter (15" in FIG. 2) has two intermediate junction points and, correspondingly, three capacitors (C3, C3' and C3") which are functionally connected in series. The n-point converter in general has (n−2) intermediate junction points and, in a corresponding manner, (n−1) capacitors connected functionally in series.

In principle, multipoint converter modules as well need be coupled to the system only via the positive and the negative DC voltage busbar 11 and 12, as is the case in the example shown in FIG. 2, since the intermediate junction points are formed locally. This reduces the complexity for the DC voltage busbars 11, 12 considerably in comparison to a system having a centrally arranged capacitor unit. Furthermore, it is thus possible to operate converter modules with different numbers of points (for example a three-point converter 14' and a four-point converter 15") at the same time in the system.

Figure 3:
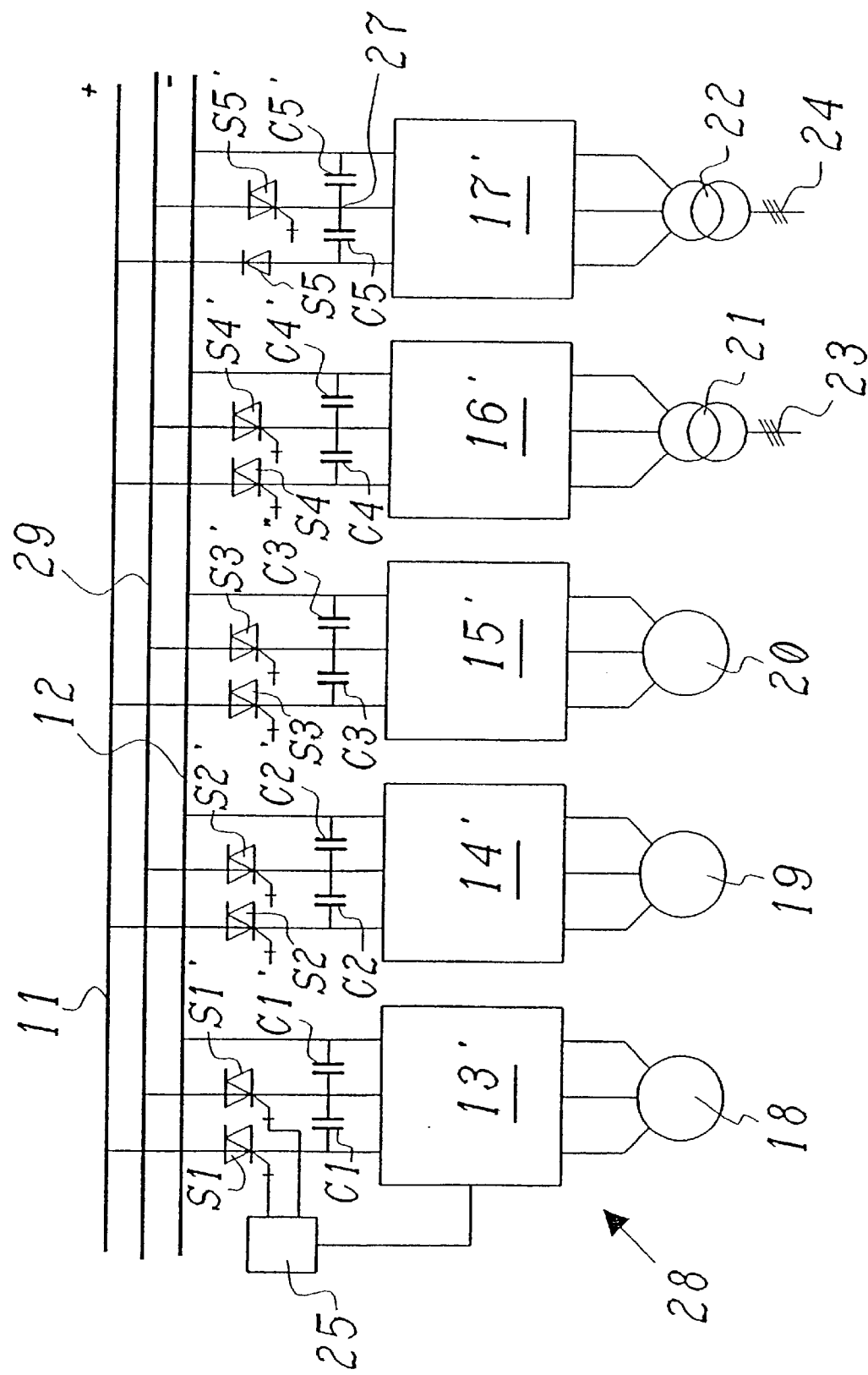
FIG. 3 shows the circuit diagram of a third exemplary embodiment of the invention with five three-point converter modules, whose intermediate points are connected to one another by means of an intermediate point busbar.

If, as shown in FIG. 3 and in order to stabilize the intermediate points 27 more simply, a connection is nevertheless desired via additional intermediate point busbars 29, protective switches or protective semiconductor switches S1, S1'; ...; S5, S5' must be inserted in a suitable manner into at least (n−1) of the n connections for the busbars. In a system having a number of three-point converters 13', ..., 17' (FIG. 3), there would, for example, in the latter case, be three busbars 11, 12 and 29, and two protective semiconductor switches S1, S1'; ...; S5, S5' would therefore have to be used for each converter module 13', ..., 17'.

Figure 4:
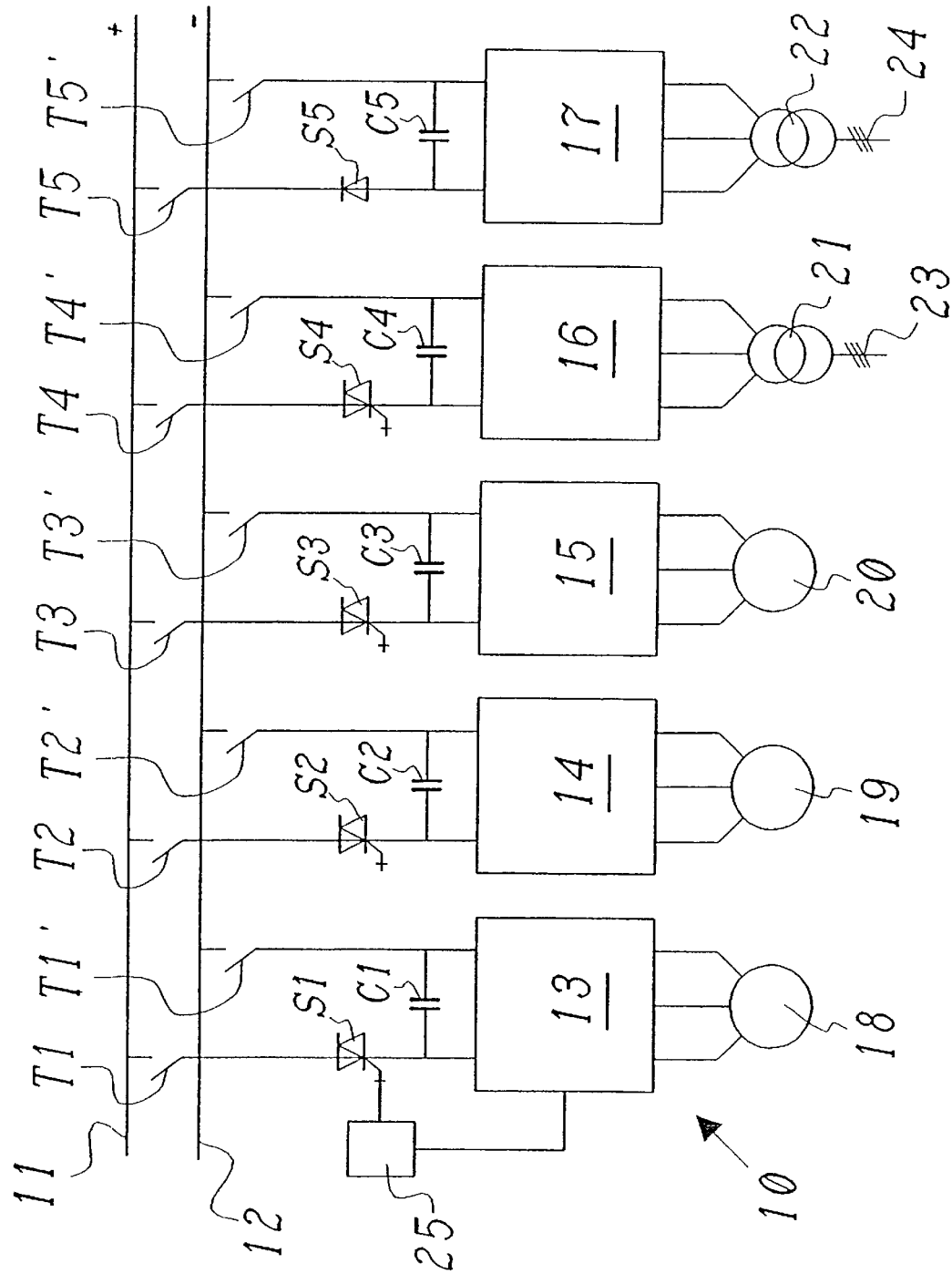
FIG. 4 shows the circuit diagram of a fourth exemplary embodiment of the invention, in which the arrangement as shown in FIG. 1 has had additional isolating means added to it, for DC isolation of the modules from the intermediate circuit.

Rapid interruption of the connection between the DC voltage busbars 11, 12 and the defective converter module by means of the protective switches in the event of a fault makes it possible to continue to operate the rest of the system. If, as shown in FIG. 4, isolating means T1, T1'; ..., T5, T5', for example in the form of a mechanical switch, are in each case inserted at the connection point of a converter module to the DC voltage busbar, which allow the converter module to be DC-isolated from the system after the occurrence of the defect, it is possible subsequently to repair the defective module, and then to reconnect it to the system.

LIST OF REFERENCE SYMBOLS 10, 26, 28 converter system
11, 12 DC voltage busbar
13 ..., 15 load converter module
13', ..., 15', 15" load converter module
16 power supply system converter module (active)
17 power supply system converter module (passive)
18, 19 asynchronous machine (ASM)
20 synchronous machine (SM)
21, 22 power supply system transformer
23, 24 power supply system (3-phase)
25 drive device
27 intermediate junction point
29 intermediate point busbar
C1 ..., C5 capacitor (local intermediate circuit)
C1', ..., C5', C3" capacitor (local intermediate circuit)
T1 ..., T5 isolating means (DC isolation)
T1', ..., T5' isolating means (DC isolation)
S1 ,..., S5 protective switch (semiconductor switch)
S1', ..., S5' protective switch (semiconductor switch)

What is claimed is:

1. A converter system having a number of individual converter modules, which are in the form of load converter modules or power supply system converter modules and are connected to one another via a DC voltage intermediate circuit, which has two DC voltage busbars and a DC voltage intermediate circuit capacitance arranged between the DC voltage busbars, wherein the DC voltage intermediate circuit capacitance is subdivided into a number of parts corresponding to the number of converter modules, each of the converter modules being associated with a portion of the DC voltage intermediate circuit capacitance which forms a local intermediate circuit, and the converter modules being coupled together with their local intermediate circuits to the DC voltage busbars by means of at least one protective switch, wherein at least one of the converter modules is a converter module which exclusively transfers power from its AC voltage terminals to the DC voltage intermediate circuit, and wherein the protective switch for this converter module is a semiconductor diode.

2. The converter system as claimed in claim 1, wherein at least one of the converter modules is a converter module which transfers power from the DC voltage intermediate circuit to its AC voltage terminals, and the protective switch in this converter module is a controllable power semiconductor switch.

3. The converter system as claimed in claim 2, wherein the protective switch is driven by a drive device which is operatively connected to the associated converter module.

4. The converter system as claimed in claim 1, wherein at least one of the converter modules is a multipoint converter module, and the associated local intermediate circuit has a series circuit of capacitors, whose junction points form corresponding intermediate points.

5. The converter system as claimed in claim 4, wherein a number of converter modules are in the form of multipoint converter modules, and wherein corresponding intermediate point busbars are provided for connecting the intermediate points in the local intermediate circuits.

6. The converter system as claimed in claim 5, wherein if the number of busbars is n, protective switches are arranged in at least (n-1) junctions between the local intermediate circuits and the busbars.

7. The converter system as claimed in claim 1, wherein the converter modules are connected, together with the local intermediate circuits and the protective switches, via additional isolating means to the busbars, which isolating means allow DC isolation between the converter modules and the busbars.

8. A method for operation of a converter system as claimed in claim 7, wherein when a defect occurs in one of the converter modules and the associated protective switch or switches opens or open, the defective converter module is DC-isolated from the system by the associated isolating means.

9. The method as claimed in claim 8, wherein once the system has been DC-isolated, the defective converter module is repaired, and is then reconnected to the system.

* * * * *

UNITED STATES PATENT AND TRADEMARK OFFICE
CERTIFICATE OF CORRECTION

PATENT NO. : 6,528,903 B2
DATED : March 4, 2003
INVENTOR(S) : Jurgen Steinke

It is certified that error appears in the above-identified patent and that said Letters Patent is hereby corrected as shown below:

Title page,
Item [73], Assignee, change "ABB Industrie AG" to -- ABB Schweiz AG --.

Signed and Sealed this

First Day of June, 2004

JON W. DUDAS
*Acting Director of the United States Patent and Trademark Office*